(12) United States Patent
Baumann et al.

(10) Patent No.: US 11,346,749 B2
(45) Date of Patent: May 31, 2022

(54) KINGPIN UNIT

(71) Applicant: AKTIEBOLAGET SKF, Gothenburg (SE)

(72) Inventors: Michael Baumann, Gädheim (DE); Matthias Hofmann, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 88 days.

(21) Appl. No.: 16/919,478

(22) Filed: Jul. 2, 2020

(65) Prior Publication Data

US 2021/0010900 A1    Jan. 14, 2021

(30) Foreign Application Priority Data

Jul. 8, 2019 (DE) .......................... 102019210005.8

(51) Int. Cl.
 *F16C 19/08* (2006.01)
 *F16C 19/54* (2006.01)
 *G01M 13/04* (2019.01)
 *G01M 13/045* (2019.01)

(52) U.S. Cl.
 CPC ........... *G01M 13/045* (2013.01); *F16C 19/08* (2013.01); *F16C 2233/00* (2013.01)

(58) Field of Classification Search
 CPC .... F16C 19/08; F16C 19/527; F16C 2233/00; F16C 2360/23; F16C 2360/31; G01M 13/028; G01M 13/045; F16H 57/0471
 See application file for complete search history.

(56) References Cited

U.S. PATENT DOCUMENTS

| 4,135,401 A | 1/1979 | LeBreton | |
| 2001/0030466 A1* | 10/2001 | Ehrlich | G01P 3/488 303/191 |
| 2014/0157880 A1* | 6/2014 | Matsuda | F16C 41/008 73/112.01 |
| 2017/0059448 A1* | 3/2017 | Meaney | F16C 41/008 |

FOREIGN PATENT DOCUMENTS

| CA | 2200647 A1 | 9/1998 |
| EP | 2899101 A1 | 7/2015 |
| JP | S5997316 U | 7/1984 |
| JP | 2007270941 A | 10/2007 |
| WO | 0145993 A1 | 6/2001 |
| WO | 0246025 A2 | 6/2002 |
| WO | 02102642 A1 | 12/2002 |

OTHER PUBLICATIONS

Search Report from the British Patent Office dated Nov. 18, 2020 in related application No. GB2010323.0.
Written opinion and Preliminary Search Report dispatched Sep. 15, 2021 in related Application FR2007167, and translation thereof.

* cited by examiner

*Primary Examiner* — Phillip A Johnson
(74) *Attorney, Agent, or Firm* — J-Tek Law PLLC; Scott T. Wakeman; Mark A. Ussai

(57) ABSTRACT

A kingpin unit includes a kingpin having an inner bore, a sensor tube formed as a hollow sleeve disposed in the inner bore of the kingpin, and at least one sensor disposed in the sensor tube. The sensor is configured to sense a condition of at least one bearing formed or mounted on the kingpin and is mounted in the interior of the sensor tube at, for example, an opening in a side wall of the sensor tube.

20 Claims, 3 Drawing Sheets

KINGPIN UNIT

CROSS-REFERENCE

This application claims priority to German patent application no. 10 2019 210 005.8 filed on Jul. 8, 2019, the contents of which are fully incorporated herein by reference.

TECHNOLOGICAL FIELD

The present disclosure is directed to a kingpin unit including a stationary kingpin configured to support a rotary member for rotation relative to the kingpin.

BACKGROUND

In the field of marine energy, directly driven tidal turbines including slowly moving ring generators can be used. Here a stationary kingpin can be supported in a rotating housing. Such a stationary kingpin can also be used in other areas, such as, for example, wheel bearings for motor vehicles, planetary transmissions, or wind turbines. The support is usually effected by one or more bearings (rolling-element or plain bearings). In order to ensure a proper operation of the bearings and of the rotating bearing assembly, it is necessary to monitor the bearings in order to be able to recognize a failure of the bearings in a timely manner and be able to react accordingly. For example, vibration sensors can be used in order to detect undesirable vibrations of the bearings that can indicate a defect. Such vibration sensors should be positioned as close as possible to the bearings in order to allow for meaningful state monitoring; however, since the bearing housing rotates, it is complicated to accommodate sensors in the rotating housing and to transmit data sensed by the sensors to the stationary part, e.g., to the stationary nacelle housing.

SUMMARY

It is therefore an aspect of the present disclosure to provide a system that makes possible a good state monitoring of the bearings.

A kingpin unit according to the present disclosure can be used, for example, for directly driven tidal turbines including a slowly moving ring generator. An application in other areas, such as, for example, wheel bearings for motor vehicles, planetary transmissions, or wind turbines, is also possible. The kingpin unit includes a stationary kingpin that includes an inner bore. The kingpin is supported in a housing by at least one bearing. In order to be able to monitor this bearing, the kingpin unit includes a sensor tube in which at least one sensor for monitoring the at least one bearing is disposed. A plurality of bearings can also be monitored by a single sensor. The sensor tube is configured as a hollow sleeve and disposed in the inner bore of the kingpin. In this way the sensors that are disposed inside the sensor tube, i.e., in the hollow sleeve, can be easily pushed into the inner bore of the kingpin. The sensors are disposed such that as soon as the sensor tube is pushed into the kingpin, the sensors lie at positions that are disposed as close as possible to the at least one bearing. The sensors can preferably be vibration sensors, but also other sensors, such as, for example, temperature sensors.

According to one embodiment, the sensor tube includes a flange that permits the sensor tube to be axially attached to the kingpin. In this way the sensor tube can be attached to the kingpin in a particularly simple manner from outside using the flange.

According to a further embodiment, the sensor tube includes at least one opening. The opening is disposed on the outer surface of the hollow sleeve of the sensor tube. The at least one sensor is disposed in the interior of the sensor tube at the opening of the sensor tube. Since the sensor is disposed in this opening, the sensor can abut directly against the kingpin. In this way vibrations, for example, can be transmitted particularly well from the at least one bearing via the kingpin to the sensor because they are not shielded by the sensor tube.

In particular, an attachment mechanism can be provided that is disposed in the at least one opening in order to attach the sensor to the sensor tube. The attachment mechanism can be, for example, screws or other threaded fasteners. It can thereby be ensured that the sensor is located at the opening and thus at a position inside the sensor tube at which the vibrations are not shielded from the sensor by the sensor tube.

In order to allow for the simple insertion of the sensor tube into the kingpin, according to a further embodiment the sensor can have a smaller diameter at the axial end that is first introduced into the kingpin. Due to this smaller diameter in comparison to the remaining diameter of the sensor tube a simple insertion of the sensor tube into the kingpin is possible.

According to a further embodiment, the sensor tube includes an axially extending slot. The slot allows the sensor tube to be radially compressed in order to insert it into the kingpin. As soon as the sensor tube is located in the kingpin, the sensor tube can expand because of the slot in the manner of a snap ring and is then disposed in the kingpin, and fixed therein, by a press-fit.

According to a further embodiment, the outer circumference of the sensor tube and/or the inner bore of the kingpin have a varying diameter. Due to this varying diameter that is provided either on the kingpin or on the sensor tube or on both, it may occur that an air gap is present between the outer circumference of the sensor and the inner bore of the kingpin, and simultaneously the outer circumference of the sensor tube and the inner bore of the kingpin contact only in the region of the sensor. In this way a contact between sensor and kingpin, for example, a metal-to-metal contact, can be ensured in the region of the sensor. Due to this contact a good measuring power can be achieved, since vibrations can be passed directly via this contact to the sensor. Furthermore, in this way the sensor is disposed as close as possible to the at least one bearing, since it is located in the region of direct contact between sensor tube and kingpin. Simultaneously it can be ensured by the air gap between the sensor tube and the kingpin that the sensor tube and the kingpin only contact each other in a small region. A simple insertion of the sensor tube into the kingpin with low friction is therefore possible.

The varying diameter can be achieved, for example, by a gradually varying diameter or by a stepwise-varying diameter. This varying diameter can be provided on the kingpin and/or the sensor tube over the entire length or only in a section, for example, in the region of the sensor. The varying diameter can also be achieved by a bulge that is provided on the kingpin and/or the sensor tube such that the sensor tube and the kingpin preferably only contact at this bulge.

According to a further embodiment, the sensor is connected to a cable. This cable can be disposed in the sensor tube and guided from therein outward toward the generator in order to be connected to an external unit, for example, a control unit. In this way it is possible in a simple manner to forward data that are captured by the sensor to an external unit. Alternatively it is also possible to transmit these data wirelessly to an external unit.

According to another embodiment, a kingpin unit comprises a kingpin having an inner bore, a sensor tube and a sensor. The sensor tube comprises a hollow sleeve having a first axial end portion including a flange and a second axial end portion and a substantially cylindrical side wall portion between the first axial end portion and the second axial end portion, the side wall portion having an opening. The sensor tube is disposed in the inner bore of the kingpin with the flange connected to the kingpin. At least one sensor is mounted in the sensor tube at the opening in direct contact with the inner bore of the kingpin, and the sensor is configured to sense a condition of at least one bearing formed or mounted on the kingpin. A diameter of the first axial end portion is greater than a diameter of the second axial end portion, the sensor tube has an axially extending slot configured to allow radial compression of the sensor tube, and the outer surface of the kingpin and/or the inner surface of the inner bore are configured such that at least one air gap exists therebetween.

Further advantages and advantageous embodiments are specified in the description, the drawings, and the claims. Here in particular the combinations of features specified in the description and in the drawings are purely exemplary, so that the features can also be present individually or combined in other ways.

In the following the invention will be described in more detail using exemplary embodiments depicted in the drawings. Here the exemplary embodiments and the combinations shown in the exemplary embodiments are purely exemplary and are not intended to define the scope of the invention. This scope is defined solely by the pending claims.

DETAILED DESCRIPTION

In the following, identical or functionally equivalent elements are designated by the same reference numbers.

Figure 1:
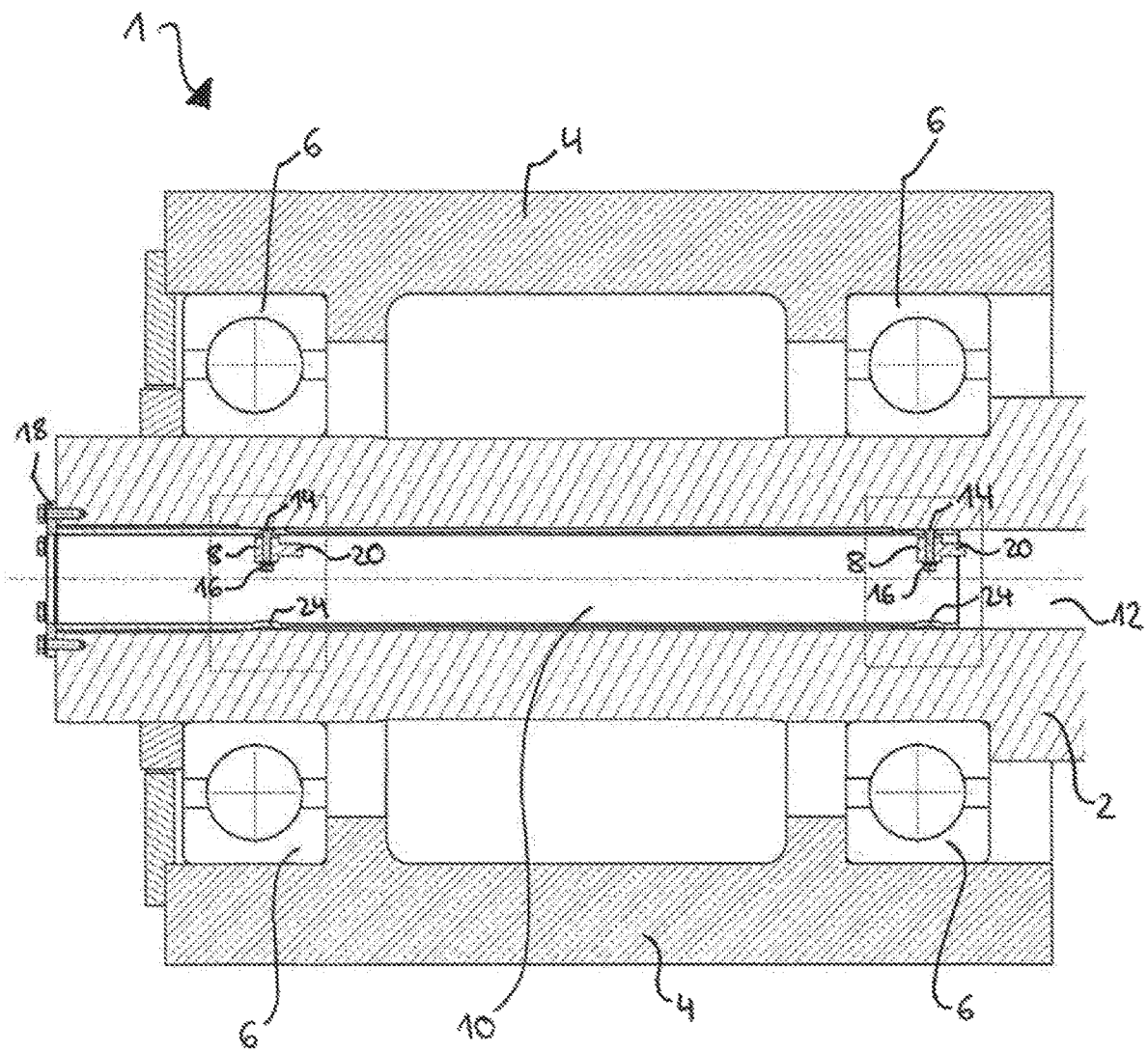
FIG. 1 is a longitudinal section of a kingpin unit according to the present disclosure.

FIG. 1 shows a longitudinal section through a kingpin unit 1 which may be, for example, a kingpin unit 1 of a tidal turbine. However, the kingpin unit 1 described here can also be used in other areas, such as, for example, wheel bearings for motor vehicles, planetary transmissions, or wind turbines. The kingpin unit 1 includes a kingpin 2 that is supported in a housing 4 by bearings 6. In order to be able to monitor the state of the bearings 6, sensors 8 are provided. These sensors 8 can be, for example, vibration sensors.

In order to be able to position the sensors 8 as close as possible to the bearings 6, a sensor tube 10 is provided that is disposed in an inner bore 12 of the kingpin 2. Here the sensors 8 are disposed in the sensor tube 10 such that they are positioned as close as possible to the bearings 6. For this purpose openings 14 are preferably provided in the sensor tube 10, in or at which openings 14 the sensors 8 are disposed. Due to the arrangement of the sensors 8 in or on the openings 14, vibrations, for example, are transmitted directly from the bearings 6 via the kingpin 2 to the sensors 8 and not shielded by the sensor tube 10. The sensors 8 can be fixed to the sensor tube 10 via an attachment mechanism 16. The attachment mechanism 16 can be, for example, screws or other threaded fasteners.

Furthermore, the attachment mechanism 16 can include spring elements for resiliently supporting the sensors 8. During insertion of the sensor tube 10 into the kingpin 2, in this case the sensors 8 are located in the sensor tube 10. As soon as the sensor tube 10 reaches its final position, the sensors 8 are pressed against the kingpin 2 through the openings 14. A contact is thus produced between the kingpin 2 and the sensors 8 in order to be able to transmit, for example, vibrations from the bearings though the kingpin to the sensors.

In order to attach the sensor tube 10 in the kingpin 2, a flange 18 is provided on the sensor tube 10. Via the flange 18, the sensor tube 10 can be attached axially to the kingpin 2, for example, fixedly screwed.

In order to forward data that are detected by sensors 8 to a control unit or a different unit, cables (not shown) can be connected to the sensors 8. For this purpose the sensors 8 can include terminals 20 that can be connected to such a cable.

Figure 2:
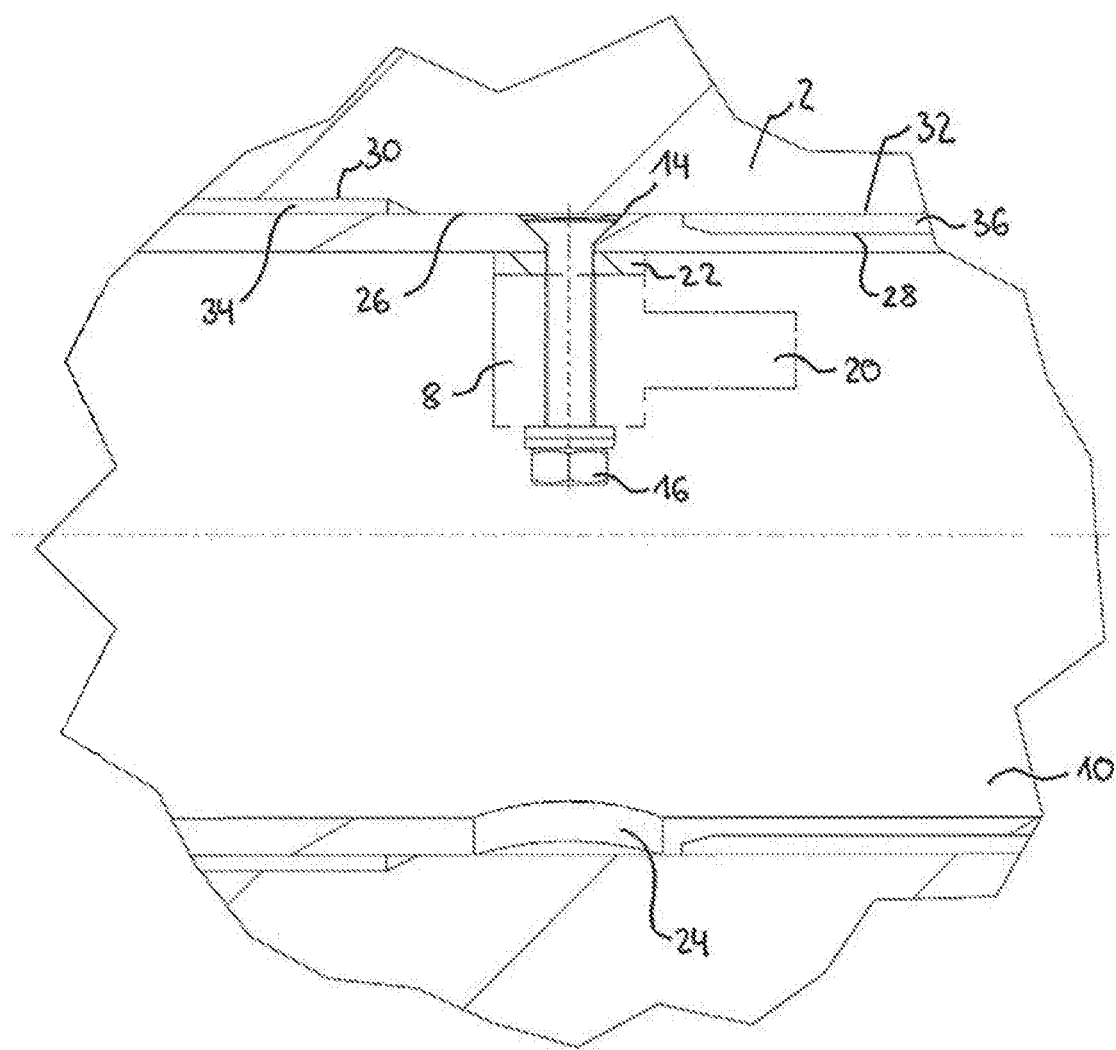
FIG. 2 is a detail view of a portion of the kingpin unit of FIG. 1.

A detail view of an arrangement of a sensor 8 is depicted in FIG. 2. As can be seen here, a direct contact is produced by the attachment mechanism 16 between the attachment mechanism 16 and the kingpin 2, as well as between the sensor tube 10 and the kingpin 2. The contact can be, for example, a metal-to-metal contact. Due to this direct contact a particularly good transmission, in particular of vibrations from the bearings 6 to the sensor 8, can be ensured. A washer 22 can be disposed between the sensor 8 and the sensor tube 10 via which a direct contact can also be produced. The attachment mechanism 16 can furthermore be used to adjust the sensor 8 on the surface of the kingpin 2.

In order to attach the sensor 8 in the sensor tube using the attachment mechanism 16, an opening 24 opposite the opening 14 can be provided. It is possible to insert a tool through this opening 24 into the sensor tube 10 in order to tighten the attachment mechanism 16.

The outer circumference of the sensor tube 10 and/or the inner bore 12 of the kingpin 2 can have a varying diameter. Due to such a varying diameter air gaps 34, 36 may be present between the kingpin 2 and the sensor tube 10, and a contact between the sensor tube 10 and the kingpin 2 is present only in a region wherein the sensor is disposed. Since the kingpin 2 and the sensor tube 10 only contact in this small region, the sensor tube 10 can be introduced into the kingpin 2 with low friction.

The varying diameter can be implemented on the kingpin 2 and/or the sensor tube 10 by a gradually varying diameter, a stepwise-varying diameter, and/or by bulges. In the embodiment shown in FIG. 2, both the sensor tube 10 and the inner bore 12 of the kingpin 2 have a stepped diameter. The sensor tube 10 has a stepped design wherein a first diameter 26 in a first region and a second diameter 28 in a second region of the sensor tube 10 are provided. In its inner bore the kingpin 2 also includes a stepped design having a first diameter 30 and a second diameter 32.

Figure 3:
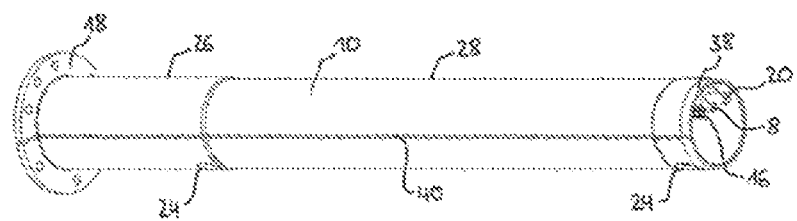
FIG. 3 is a perspective view of a sensor tube according to the disclosure.

FIG. 3 shows a perspective view of the sensor tube 10, wherein a stepwise-varying diameter is also shown here. The sensor tube 10 has a first diameter 26 and a second diameter 28. In addition, at the end by which the sensor tube 10 is first introduced into the kingpin, the sensor tube 10 has a smaller diameter 38 in order to facilitate insertion into the kingpin 2.

The sensor tube 10 can include an axially extending slot 40. This slot 40 allows the sensor tube to be compressed radially during insertion into the kingpin 2. As soon as the sensor tube 10 is located in the kingpin 2, the sensor tube 10 can expand again in the manner of a snap ring and is thus held in the kingpin 2 by a press-fit.

Due to the disclosed kingpin unit it is possible to enable a simple and uncomplicated arrangement of sensors inside a kingpin. Due to the simple arrangement of the sensors in the kingpin using a sensor tube, a good monitoring of at least one bearing of the kingpin can be ensured.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved kingpin units.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Kingpin unit
2 Kingpin
4 Housing
6 Bearing
8 Sensors
10 Sensor tube
12 Inner bore
14 Openings
16 Attachment means
18 Flange
20 Terminal
22 Washer
24 Opening
26 First diameter of the sensor
28 Second diameter of the sensor
30 First diameter of the kingpin
32 Second diameter of the kingpin
34 Air gap
36 Air gap
38 Smaller diameter
40 Axially extending slot

What is claimed is:

1. A kingpin unit comprising:
    a kingpin having an inner bore,
    a sensor tube disposed in the inner bore of the kingpin, and
    a sensor disposed in the sensor tube, the sensor being configured to sense a condition of a bearing formed on or mounted on the kingpin,
    wherein the sensor tube includes a cylindrical side wall,
    wherein an opening extends through the cylindrical sidewall, and
    wherein the sensor is disposed at the opening.
2. The kingpin unit according to claim 1, wherein the sensor tube includes a flange configured to allow the sensor tube to be axially attached to the kingpin.
3. The kingpin unit according to claim 1, including attachment means disposed at the at least one opening for attaching the sensor in the sensor tube.
4. The kingpin unit according to claim 1, including a fastener at the at least one opening configured to attach the sensor in the sensor tube.
5. The kingpin unit according to claim 1,
    wherein a first axial end of the sensor tube has a first diameter, a second axial end of the sensor tube has a second diameter and wherein the first diameter is less than the second diameter.
6. The kingpin unit according to claim 1, wherein the sensor tube includes an axially extending slot.
7. The kingpin unit according to claim 6, wherein the outer circumference of the sensor tube and/or the inner bore of the kingpin have a gradually varying diameter, a stepwise-varying diameter, and/or a bulge.
8. The kingpin unit according to claim 1, wherein an outer circumference of the sensor tube changes along a length of the sensor tube and a diameter of the inner bore of the kingpin changes along a length of the kingpin.
9. The kingpin unit according to claim 1, wherein the outer circumference of the sensor tube and the inner bore of the kingpin come into contact in a region of the sensor, and/or wherein an air gap is provided between the outer circumference of the sensor tube and the inner bore of the kingpin.
10. The kingpin unit according to claim 1, wherein the sensor is connected to a cable disposed in the sensor tube and connectable to an external unit.
11. The kingpin unit according to claim 1,
    wherein the sensor at least partially overlies the opening.
12. The kingpin unit according to claim 11,
    wherein the sensor is disposed entirely radially inside the bearing.
13. The kingpin unit according to claim 1,
    wherein the sensor is attached to the sensor tube by a fastener having a first end in the sensor tube and a second end in the opening.
14. The kingpin unit according to claim 13,
    wherein the sensor tube includes a hole diametrically aligned with the opening.
15. The kingpin unit according to claim 13,
    wherein the fastener extends into the sensor tube from outside the sensor tube and has a head portion larger than the opening.
16. The kingpin unit according to claim 13,
    wherein the sensor or the fastener directly contacts the inner bore of the kingpin.
17. The kingpin unit according to claim 13,
    wherein the sensor comprises a vibration sensor.
18. The kingpin unit according to claim 1,
    wherein the sensor comprises a vibration sensor.

19. A kingpin unit comprising:
a kingpin having an inner bore,
a sensor tube comprising a hollow sleeve disposed in the inner bore of the kingpin, and
at least one sensor disposed in the sensor tube, the sensor being configured to sense a condition of at least one bearing formed on or mounted on the kingpin,
wherein the sensor tube includes at least one opening,
wherein the at least one sensor is mounted to the sensor tube at the at least one opening in direct contact with the inner bore, and
wherein the sensor tube includes a flange connected to the kingpin.

20. A kingpin unit comprising:
a kingpin having an inner bore,
a sensor tube comprising a hollow sleeve having a first axial end portion including a flange and a second axial end portion and a substantially cylindrical side wall portion between the first axial end portion and the second axial end portion, the side wall portion having an opening, the sensor tube being disposed in the inner bore of the kingpin and the flange being connected to the kingpin, and
at least one sensor mounted in the sensor tube at the opening in direct contact with the inner bore of the kingpin, the sensor being configured to sense a condition of at least one bearing formed on or mounted on the kingpin,
wherein a diameter of the first axial end portion is greater than a diameter of the second axial end portion,
wherein the sensor tube has an axially extending slot configured to allow radial compression of the sensor tube, and
wherein the outer surface of the kingpin and/or the inner surface of the inner bore are configured such that at least one air gap exists therebetween.

\* \* \* \* \*